(12) United States Patent
Kon et al.

(10) Patent No.: US 9,994,075 B2
(45) Date of Patent: Jun. 12, 2018

(54) TIRE AND TIRE MANUFACTURING METHOD

(71) Applicant: BRIDGESTONE CORPORATION, Chuo-ku, Tokyo (JP)

(72) Inventors: Seiji Kon, Tokyo (JP); Keiichi Hasegawa, Tokyo (JP); Yoshihide Kouno, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 235 days.

(21) Appl. No.: 14/784,580

(22) PCT Filed: Apr. 17, 2014

(86) PCT No.: PCT/JP2014/060977
§ 371 (c)(1),
(2) Date: Oct. 15, 2015

(87) PCT Pub. No.: WO2014/171521
PCT Pub. Date: Oct. 23, 2014

(65) Prior Publication Data
US 2016/0068021 A1    Mar. 10, 2016

(30) Foreign Application Priority Data
Apr. 18, 2013 (JP) ................. 2013-087432

(51) Int. Cl.
*B60C 5/01* (2006.01)
*B60C 9/18* (2006.01)
*B60C 9/22* (2006.01)
*B29D 30/30* (2006.01)
*B60C 5/00* (2006.01)
*B29D 30/20* (2006.01)
*B29D 30/08* (2006.01)
*B60C 9/20* (2006.01)

(52) U.S. Cl.
CPC ............ *B60C 9/2204* (2013.01); *B29D 30/20* (2013.01); *B29D 30/3028* (2013.01); *B60C 5/007* (2013.01); *B60C 5/01* (2013.01); *B29D 2030/086* (2013.01); *B60C 2009/2035* (2013.01); *B60C 2009/2238* (2013.01)

(58) Field of Classification Search
CPC ................ B60C 5/00; B60C 5/01; B60C 9/18
See application file for complete search history.

(56) References Cited

U.S. PATENT DOCUMENTS

| | | | | |
|---|---|---|---|---|
| 3,956,546 | A * | 5/1976 | Neville | ................. B60C 9/0042 156/117 |
| 3,977,453 | A * | 8/1976 | Coran | ................... B29D 30/08 152/323 |
| 2011/0297283 | A1 | 12/2011 | Kouno et al. | |

FOREIGN PATENT DOCUMENTS

| | | |
|---|---|---|
| JP | 2011-42235 A | 3/2011 |
| WO | 2010/095688 A1 | 8/2010 |

* cited by examiner

*Primary Examiner* — Justin R Fischer
(74) *Attorney, Agent, or Firm* — SOLARIS Intellectual Property Group, PLLC

(57) ABSTRACT

A tire includes: a tire case serving as an example of a circular tire frame member that is formed using a frame resin material; and a reinforcing cord member that is disposed at an outer circumference of the tire case, that is configured by a reinforcing cord covered with a resin covering layer, that is wound along a tire circumferential direction so as to form a spiral shape, that is bonded to the tire case, and in which tire axial direction adjacent portions of the reinforcing cord member are bonded together.

4 Claims, 9 Drawing Sheets

TIRE AND TIRE MANUFACTURING METHOD

TECHNICAL FIELD

The present invention relates to a tire having a tire frame portion formed from a resin material, and to a tire manufacturing method of the same.

BACKGROUND ART

Recently, tires are being developed that have tire frame portions formed from resin materials (for example, thermoplastic resins) in order to achieve a reduction in weight and easy recycling properties (see, for example, Japanese Patent Application Laid-Open (JP-A) No. 2011-42235).

The tire described in JP-A No. 2011-42235 has a reinforcing layer disposed at the outer circumference of a crown portion of a ring shaped tire frame member formed from a resin material in order to reinforce the tire frame member. The reinforcing layer is formed by winding a resin covered reinforcing cord along the tire circumferential direction onto the crown portion outer circumference so as to form a spiral shape, and bonding the reinforcing cord.

SUMMARY OF INVENTION

Technical Problem

In consideration of the above circumstances, an object of the present invention is to raise the rigidity of the tire frame member formed from resin material.

Solution to Problem

A tire of a first aspect of the present invention includes: a circular tire frame member that is formed using a frame resin material; and a reinforcing cord member that is disposed at an outer circumference of the tire frame member, that is configured by a reinforcing cord covered with a resin covering layer, that is wound along a tire circumferential direction so as to form a spiral shape, that is bonded to the tire frame member, and in which tire axial direction adjacent portions of the reinforcing cord member are bonded together.

A tire manufacturing method of a second aspect of the present invention includes: a tire frame member forming process in which a circular tire frame member is formed using a frame resin material; and a reinforcing cord member winding process in which, while winding a reinforcing cord member that is configured by a reinforcing cord covered with a resin covering layer onto an outer circumference of the tire frame member along a tire circumferential direction so as to form a spiral shape, the reinforcing cord member is bonded to the tire frame member, and tire axial direction adjacent portions of the reinforcing cord member are bonded together.

Advantageous Effects of Invention

As explained above, the tire and the tire manufacturing method of the present invention enables the rigidity of a tire frame member formed from a resin material to be raised.

DESCRIPTION OF EMBODIMENTS

First Exemplary Embodiment

Explanation follows regarding a tire of a first exemplary embodiment according to the present invention.

Figure 1:
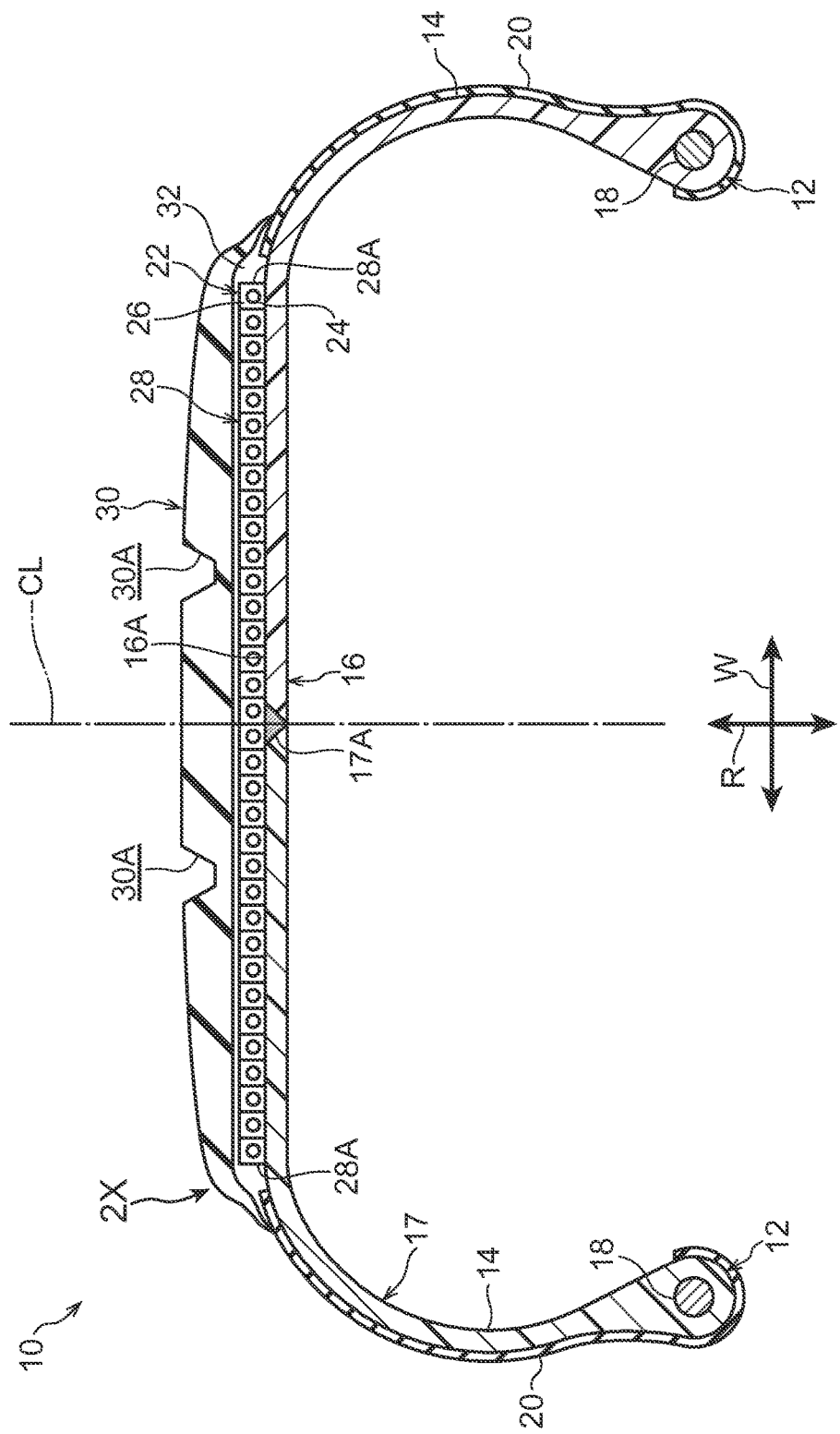
FIG. 1 is a cross-section taken along the tire axial direction of a tire of a first exemplary embodiment.

As illustrated in FIG. 1, a tire 10 of the first exemplary embodiment exhibits substantially the same cross-section profile as a conventional rubber-made pneumatic tire (hereafter referred to as a rubber tire, as appropriate) and, similarly to a rubber tire, is fitted to a rim (not illustrated in the drawings). Note that in the drawings, the arrows S indicate the tire circumferential direction, the arrows W indicate the tire axial direction (which may also be read as being the tire width direction), and the arrows R indicate the tire radial direction.

In the following explanation, the side away from the tire equatorial plane CL along the tire axial direction is referred to as the "tire axial direction outside", and the side near to the tire equatorial plane CL along the tire axial direction is referred to as the "tire axial direction inside".

Moreover, the side away from the tire axis along the tire radial direction is referred to as the "tire radial direction outside", and the side near to the tire axis along the tire radial direction is referred to as the "tire radial direction inside".

The tire 10 includes a tire case 17 as an example of a tire frame member forming a tire frame portion. The tire case 17 is formed in a circle from a resin material for use in a tire frame (hereafter referred to as a "frame resin material").

The circumferential direction, the axial direction, and the radial direction of the tire case 17 correspond to the tire circumferential direction, tire axial direction, and the tire radial direction, respectively.

The tire case 17 is configured including a pair of bead portions 12 that are disposed spaced along the tire axial direction, a pair of tire side portions 14 that respectively extend from the pair of bead portions 12 toward the tire radial direction outside, and a crown portion 16 that couples the pair of side portions 14 together.

The bead portions 12 are locations that contact a rim (not illustrated in the drawings), and a covering layer 20, described later, is adhered to the outer circumferential surfaces of the bead portions 12.

The side portions 14 are formed to side portions of the tire 10, and gently curve from the bead portions 12 toward the crown portion 16 so as to protrude toward the tire axial direction outside.

The crown portion 16 is a location that couples the tire radial direction outside end of one of the side portions 14 to the tire radial direction outside end of the other of the side portions 14, and the crown portion 16 supports a tread 30 (described in detail later) disposed at the tire radial direction outside.

In the present exemplary embodiment, the crown portion 16 is formed with a substantially uniform thickness, and an outer circumferential surface 16A is flat-shaped in tire axial direction cross-section. In other words, the outer circumferential surface 16A of the crown portion 16 has a distance to the tire axis that is substantially constant from one end to the other end in the tire axial direction (reference here to "substantially constant" permits a difference in distance of about ±3 mm). The outer circumferential surface 16A of the crown portion 16 in the present exemplary embodiment is a portion disposed with a reinforcing cord member 22, described later.

Moreover, in the present exemplary embodiment, explanation follows in which the surface of the tire case 17 configuring an air-filled cavity is referred to as the inner surface of the tire case 17, and the surface of the tire case 17 on the opposite side to the inner surface is referred to as the outer surface of the tire case 17. The outer circumferential surface 16A of the crown portion 16 may also be read a being the outer surface of the crown portion 16.

In the present exemplary embodiment, the outer circumferential surface 16A of the crown portion 16 is formed flat-shaped in tire axial direction cross-section; however, the present invention is not limited thereto, and the outer circumferential surface 16A may be formed so as not to be flat-shaped in tire axial direction cross-section. For example, the outer circumferential surface 16A of the crown portion 16 may be formed with a curved profile (a circular arc profile) that bulges toward the tire radial direction outside in tire axial direction cross-section.

Moreover, the tire case 17 is formed from a pair of circular tire half parts 17H that are formed from a single resin material, and that each, as illustrated in FIG. 1, include a single bead portion 12, a single side portion 14, and a half-width crown portion 16. The tire half parts 17H are aligned so as to face each other and are bonded together at the respective edge portions of the half-width crown portions 16.

The present invention is not limited to the above configuration, and the tire case 17 may be an integrally molded article, or may be formed by manufacturing the tire case 17 using three or more separate resin members that are then bonded together. For example, the tire case 17 may be manufactured such that each location (for example, the bead portions 12, the side portions 14, and the crown portion 16) is separate, and then bonded together. In such cases, each of the locations of the tire case 17 may be formed from resin materials having different characteristics from each other (for example, the bead portions 12, the side portions 14, and the crown portion 16).

Moreover, reinforcing material (polymer or metal fibers, cord, non-woven fabric, woven fabric, or the like) may be disposed so as to be embedded in the tire case 17, so that the tire case 17 is reinforced by the reinforcing material.

Thermoplastic resins (including thermoplastic elastomers), thermoset resins, and other general-purpose resins, and also engineering plastics (including super engineering plastics), and the like may be employed as the resin material employed in the tire 10 of the present exemplary embodiment. These resin materials do not include vulcanized rubber.

Thermoplastic resins (including thermoplastic elastomers) are polymer compounds of materials that soften and flow with increasing temperature, and that adopt a relatively hard and strong state when cooled. In the present specification, out of these, distinction is made between polymer compounds of materials that soften and flow with increasing temperature, that adopt a relatively hard and strong state on cooling, and that have a rubber-like elasticity, considered to be thermoplastic elastomers; and polymer compounds of materials that soften and flow with increasing temperature, that adopt a relatively hard and strong state on cooling, and do not have a rubber-like elasticity, considered to be non-elastomer thermoplastic resins.

Examples of thermoplastic resins (thermoplastic elastomers included) include thermoplastic polyolefin-based elastomers (TPO), thermoplastic polystyrene-based elastomers (TPS), thermoplastic polyamide-based elastomers (TPA), thermoplastic polyurethane-based elastomers (TPU), thermoplastic polyester-based elastomers (TPC), and dynamically crosslinking-type thermoplastic elastomers (TPV), as well as thermoplastic polyolefin-based resins, thermoplastic polystyrene-based resins, thermoplastic polyamide-based resins, and thermoplastic polyester-based resins.

Such thermoplastic materials have, for example, a deflection temperature under load (at loading of 0.45 MPa), as defined by ISO 75-2 or ASTM D648, of 78° C. or greater, a tensile yield strength, as defined by JIS K7113, of 10 MPa or greater, and a tensile elongation at break (JIS K7113), also as defined by JIS K7113, of 50% or greater. Materials with a Vicat softening temperature, as defined in JIS K7206 (method A), of 130° C. may be employed.

Thermoset resins are polymer compounds that cure to form a 3 dimensional mesh structure with increasing temperature.

Examples of thermoset resins include phenolic resins, epoxy resins, melamine resins, and urea resins.

In addition to the thermoplastic resins (including thermoplastic elastomers) and thermoset resins already listed above, general purpose resins may also be employed as the resin material, such as (meth)acrylic-based resins, EVA resins, vinyl chloride resins, fluororesins, and silicone-based resins.

In the present exemplary embodiment, a thermoplastic resin is employed as the frame resin material for forming the tire case 17.

As illustrated in FIG. 1, an annular bead core 18 extending along the tire circumferential direction is embedded in each of the bead portions 12. The bead core 18 is configured by a bead cord (not illustrated in the drawings). The bead cord is configured from a metal cord (for example, a steel cord), an organic fiber cord, a resin-covered organic fiber cord, a hard resin, or the like. The bead core itself may be omitted as long as sufficient rigidity can be secured in the bead portion 12.

A covering layer 20 is formed on the surface of each of the bead portions 12 at least at the portions that contact the rim, in order to raise the sealing properties (air tightness) against the rim (not illustrated in the drawings). The covering layer 20 is formed in an annular-shape from a material that is softer than the tire case 17 and has high weather resistance.

The covering layer 20 in the present exemplary embodiment is formed using a rubber material that is softer (has higher sealing properties) than the tire case 17 and has high weather resistance.

The covering layer 20 in the present exemplary embodiment is folded back from an inner face on the tire axial direction inside of the bead portion 12 to the outer face on the tire axial direction outside, and extends as far as the vicinity of an end portion 28A on the tire axial direction outside of a reinforcing layer 28, described later, via the outer face of the side portion 14. An extension end portion of the covering layer 20 is covered by cushion rubber 32 and a tread 30, described later.

The covering layer 20 may be omitted as long as the sealing properties (air tightness) to the rim (not illustrated in the drawings) can be secured by the bead portion 12 of the tire case 17 alone.

Figure 2:
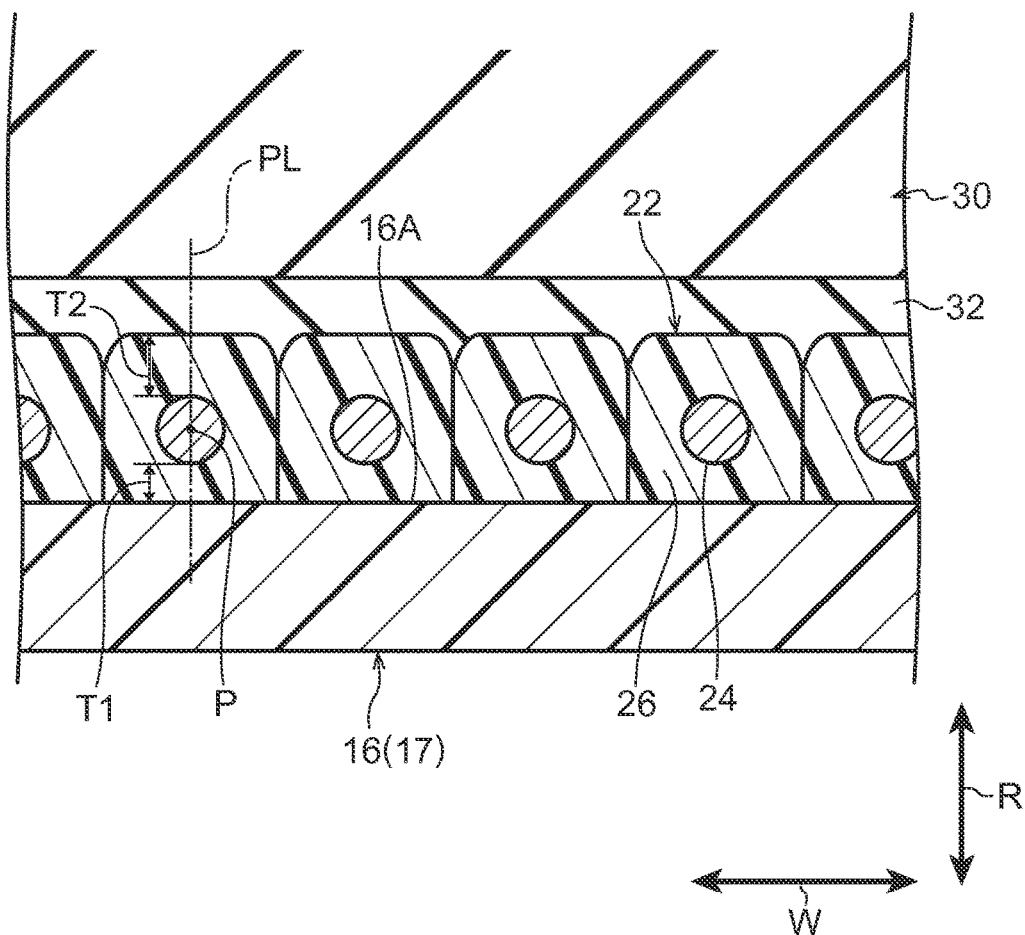
FIG. 2 is an enlargement of 2X in FIG. 1.

As illustrated in FIG. 1 and FIG. 2, the reinforcing cord member 22 is disposed at the outer circumference of the tire case 17, specifically, at the outer circumference of the crown portion 16. The reinforcing cord member 22 is configured including the reinforcing cord 24, and a resin covering layer 26 that covers the reinforcing cord 24.

The reinforcing cord 24 is configured either by a monofilament (single strand), such as a metal fiber or an organic fiber, or by twisted multi-filaments (twisted strands) of fibers thereof.

The resin covering layer 26 is formed by a resin material used for covering (covering resin material), and has a cross-section profile that is a substantially square profile. The cross-section profile of the resin covering layer 26 is not limited to being a substantially square profile. For example, a circular cross-section profile or a trapezoidal cross-section profile, may be employed.

In the present exemplary embodiment a thermoplastic resin is employed as the covering resin material forming the resin covering layer 26.

The reinforcing cord member 22 is wound along the tire circumferential direction so as to form a spiral shape, and is bonded to the outer circumference of the tire case 17 (specifically the outer circumference of the crown portion 16).

Portions of the reinforcing cord member 22 that are adjacent to each other in the tire axial direction are bonded together. The bonding together of adjacent portions adjacent to each other in the tire axial direction of the reinforcing cord member 22 may apply to some or all of the portions, however the rigidity of the reinforcing layer 28 configured by the reinforcing cord member 22 improves the wider the bonding surface area.

The reinforcing cord member 22 of the present exemplary embodiment is welded to the outer circumference of the tire case 17 (specifically to the outer circumference of the crown portion 16), and portions of the resin covering layer 26 that are adjacent to each other in the tire axial direction are welded together.

The reinforcing layer 28 reinforcing the crown portion 16 is formed by the reinforcing cord member 22 on the outer circumference of the tire case 17 (specifically on the outer circumference of the crown portion 16).

As illustrated in FIG. 2, the thickness of the resin covering layer 26 is thicker on the opposite side to the side bonded to the tire case 17 than on the side bonded to the tire case 17. Specifically, the thickness of the resin covering layer 26 is measured along a perpendicular line PL that is perpendicular to the outer circumferential surface 16A of the crown portion 16 and passes through a center P of the reinforcing cord 24.

In FIG. 2 the thickness of the resin covering layer 26 on the bonded side is indicated as T1, and the thickness of the resin covering layer 26 on the opposite side is indicated as T2.

In the present exemplary embodiment, the perpendicular line PL is along the tire radial direction due to the outer circumferential surface 16A of the crown portion 16 having a flat-shaped tire axial direction cross-section, and so the bonded side of the resin covering layer 26 may be read as the tire radial direction inside, and the opposite side of the resin covering layer 26 may be read as the tire radial direction outside. The bonded side of the resin covering layer 26 may also be read as being the air-filled cavity side of the tire case 17, and the opposite side of the resin covering layer 26 may be read as being the tread 30 side of the tire case 17.

In the present invention, as long as the tire axial direction adjacent portions of the reinforcing cord member 22 are bonded together, the reinforcing cord member 22 may be disposed on the outer circumferential surface 16A of the crown portion 16, or a portion of the reinforcing cord member 22 may be embedded in the crown portion 16.

In the present exemplary embodiment, the same material is employed for the frame resin material forming the tire case 17 and the covering resin material forming the resin covering layer 26. The present invention is, however, not limited thereto, and different materials may be employed for the frame resin material and the covering resin material.

A rubber layer configured by the cushion rubber 32 and the tread 30 in this sequence is disposed at the tire radial direction outside of the tire case 17. The cushion rubber 32 and the tread 30 each respectively cover the reinforcing layer 28 from the tire radial direction outside. The cushion rubber 32 is provided to cushion input received by the tread 30 from the road surface when running the tire 10, and to improve ride quality. The elasticity of the cushion rubber 32 is set lower than that of the tread rubber.

The tire 10 may be configured with the cushion rubber 32 omitted, and the tread 30 disposed in direct contact at the tire radial direction outside of the crown portion 16.

The tread 30 is formed with a tread pattern (not illustrated in the drawings) including plural grooves 30A in the ground contact face to the road surface.

In the present exemplary embodiment, the tread 30 is constructed from a single rubber, however, the present invention is not limited thereto, and the tread 30 may be constructed from a laminate of multiple types of rubber, or the tread 30 may be constructed with different types of rubber at central regions and end regions in the tire axial direction, or a combination thereof.

Tire Manufacturing Method

Next, explanation follows regarding an example of a manufacturing method of the tire 10 of the present exemplary embodiment.

Explanation first follows regarding a tire case forming process for forming the tire case 17.

The tire case forming process of the present exemplary embodiment is an example of a tire frame member forming process in the present invention.

First the bead core 18 is disposed in a mold (not illustrated in the drawings) for molding the tire half part 17H. Then the circular tire half part 17H is molded by injecting frame resin material into the cavity of the mold. Namely, the tire half part 17H is formed by injection molding using the frame resin material. A thermoplastic material is employed as the frame resin material in the present exemplary embodiment. The pair (set) of tire half parts 17H are molded in this manner.

Then the tire half part 17H is disposed inside a mold (not illustrated in the drawings) for forming the covering layer 20 on the outer face of the tire half part 17H, and heated, non-vulcanized rubber is injected into the cavity of the mold so as to form the covering layer 20 on the outer face of the tire half part 17H. In order to raise the bonding force of the covering layer 20 to the tire half part 17H, buffing treatment (for example, buffing treatment, grinding treatment, or sandblasting treatment) may be performed in advance to locations on the covering layer 20 that are to be disposed on the outer face of the tire half part 17H, and a bonding agent (described in detail later) may be coated on the buffing treated surfaces. The bonding agent may also be allowed to dry somewhat after being coated in order to raise the bonding force.

Figure 3:
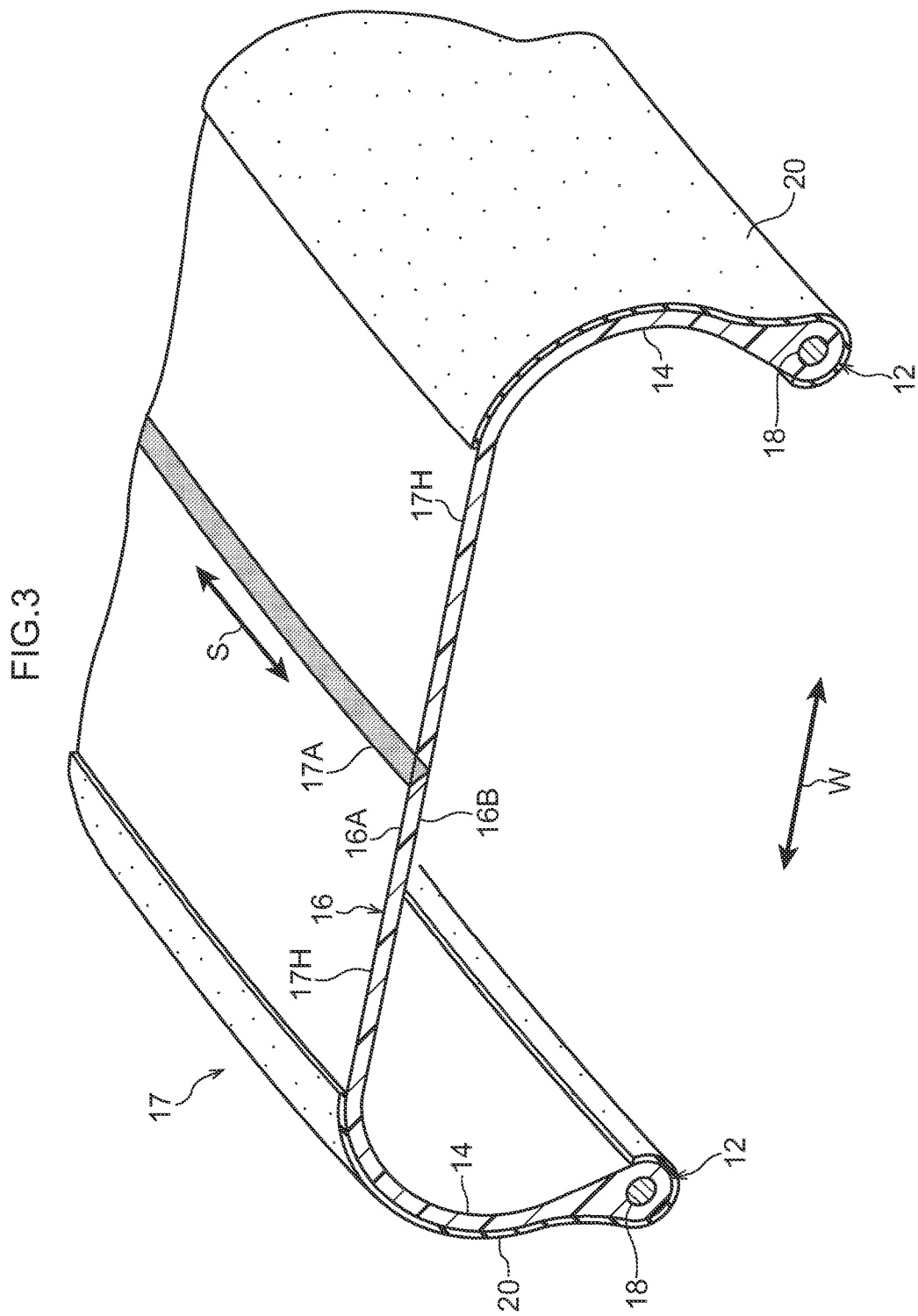
FIG. 3 is a perspective view illustrating a cross-section taken along the tire axial direction of a tire case of the first exemplary embodiment, as viewed from the outer circumferential side of the tire case.

Next, the pair of tire half parts 17H are aligned so as to face each other, edge portions of each half-width crown portion 16 are brought together, and welding resin material in a melted state is adhered to the abutted portions, bonding the pair of tire half parts 17H together (the portions that are bonded with the welding resin material are indicted with the reference numeral 17A in FIG. 3). The circular tire case 17 is accordingly formed in this manner (see FIG. 3).

Next, explanation follows regarding a reinforcing cord member winding process (see FIG. 4) for winding the reinforcing cord member 22 onto the outer circumference of the tire case 17.

The reinforcing cord member winding process of the present exemplary embodiment is an example of a reinforcing cord member winding process in the present invention.

Figure 4:
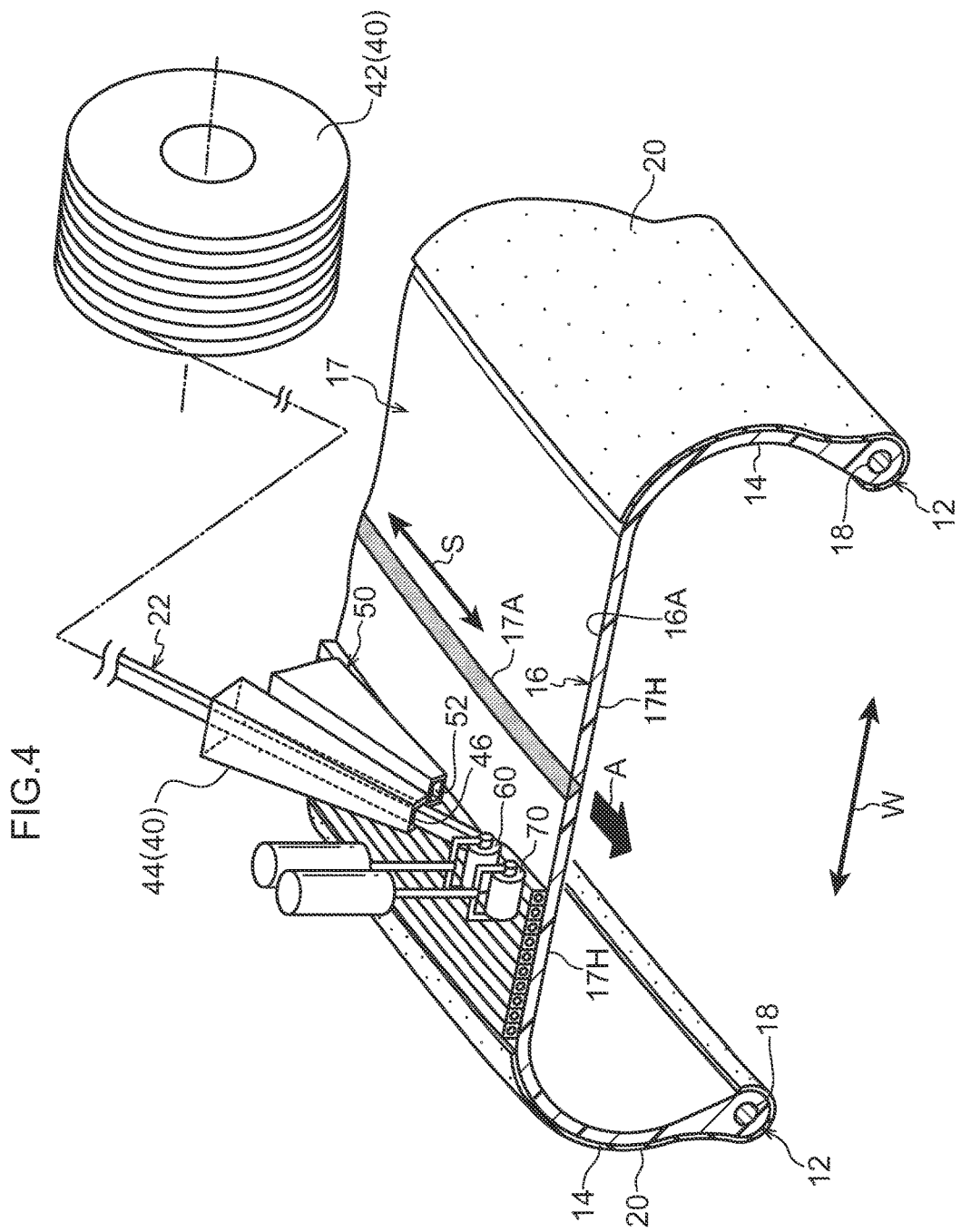
FIG. 4 is a diagram to explain a reinforcing cord member winding process of the first exemplary embodiment, and is a perspective view including a cross-section taken along the tire axial direction of a tire case, as viewed from the outer circumferential side of the tire case.
Figure 5:
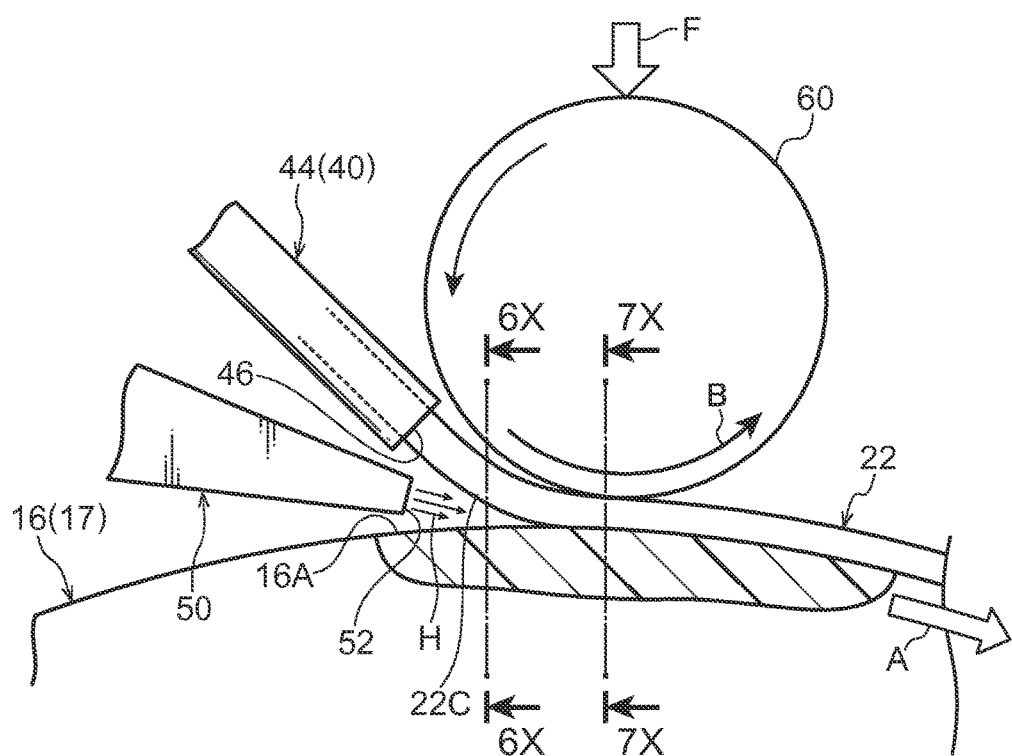
FIG. 5 is a side view of a tire case to explain an operation to dispose a reinforcing cord member on a tire case of the first exemplary embodiment.

First, the tire case 17 is attached to a tire support device (not illustrated in the drawings) for supporting the tire case 17 so as to be capable of rotating, and then, as illustrated in FIG. 4 and FIG. 5, a cord feeder device 40, a heating device 50, a press roller 60 serving as a pressing device, and a cooling roller 70 serving as a cooling device, are moved so as to approach the vicinity of the outer circumference of the tire case 17.

Explanation follows regarding the cord feeder device 40, the heating device 50, the press roller 60, and the cooling roller 70 employed in the reinforcing cord member winding process of the present exemplary embodiment.

The cord feeder device 40 is configured including a reel 42 wound with the reinforcing cord member 22 in which the reinforcing cord 24 is covered by the resin covering layer 26 formed from the covering resin material (a thermoplastic resin in the present exemplary embodiment), and including a guide member 44 for guiding the reinforcing cord member 22 as it is unwound from the reel 42 onto the outer circumference of the tire case 17 (the outer circumferential surface 16A of the crown portion 16). The guide member 44 is tube shaped such that the reinforcing cord member 22 passes through inside. The reinforcing cord member 22 is fed out from an outlet port 46 of the guide member 44 toward the outer circumferential surface 16A of the crown portion 16.

The heating device 50 blows hot air onto a sticking face 22C side of the reinforcing cord member 22, and onto the portions of the outer circumference of the tire case 17 (of the outer circumferential surface 16A of the crown portion 16) where the reinforcing cord member 22 is to be disposed, so as to heat and melt the portions being blown onto. In the present exemplary embodiment, air that has been heated by a heating element (not illustrated in the drawings) is blown from a blower nozzle 52 as an air current generated by a fan (not illustrated in the drawings), so as to blow the blown out hot air onto the sticking face 22C side of the reinforcing cord member 22, and onto portions where the reinforcing cord member 22 is to be disposed on the outer circumferential surface 16A of the crown portion 16. The configuration of the heating device 50 is not limited to the above configuration, and may be any configuration as long as it is capable of heating and melting a thermoplastic resin. For example, a hot iron may be placed in contact with the sticking face 22C of the reinforcing cord member 22 and the outer circumference of the tire case 17, so as to heat and melt the contact portion, heating and melting may be performed by radiant heating, or heating and melting may be performed by irradiation with infrared radiation.

The press roller 60 presses the reinforcing cord member 22, described later, against the outer circumference of the tire case 17 (the outer circumferential surface 16A of the crown portion 16), and is configured so as to enable the pressing force to be adjusted. The roller surface of the press roller 60 is treated so as to prevent melted resin material from adhering. The press roller 60 is rotatable, and, in a state in which the press roller 60 presses the reinforcing cord member 22 against the outer circumference of the tire case 17, is configured so as to rotate in a direction (the arrow B direction) following the rotation direction of the tire case 17 (the arrow A direction).

The cooling roller 70 is disposed further to the rotation direction downstream side of the tire case 17 than the press roller 60, and cools the reinforcing cord member 22, and cools the crown portion 16 side through the reinforcing cord member 22, while pressing the reinforcing cord member 22 against the outer circumference of the tire case 17 (the outer circumferential surface 16A of the crown portion 16). Similarly to the press roller 60, the cooling roller 70 is configured to enable the pressing force to be adjusted, and the surface of the roller is treated so as to prevent melted resin material from adhering. Moreover, similarly to the press roller 60, the cooling roller 70 is rotatable, and in a state in which the cooling roller 70 presses the reinforcing cord member 22 against the outer circumference of the tire case 17, is configured so as to rotate in a direction following the rotation direction of the tire case 17 (the arrow A direction). The cooling roller 70 is capable of cooling a member or the like placed in contact with the roller surface (the reinforcing cord member 22 in the present exemplary embodiment) through heat exchange with a liquid (for example, water) flowing through inside the roller. The cooling roller 70 may be omitted in cases in which the melted resin material is allowed to cool naturally.

Then, as illustrated in FIG. 4 and FIG. 5, the tire case 17 attached to the tire support device (not illustrated in the drawings) is rotated in the arrow A direction, and the reinforcing cord member 22 is fed out from the outlet port 46 of the cord feeder device 40 toward the outer circumferential surface 16A of the crown portion 16.

Then, while hot air is being blown out from the blower nozzle 52 of the heating device 50 toward the sticking face 22C of the reinforcing cord member 22, and toward the portions of the reinforcing cord member 22 to be disposed on the crown portion 16, and both locations are being heated and melted (see FIG. 6), the sticking face 22C of the reinforcing cord member 22 is adhered to the melted portions of the crown portion 16, and the reinforcing cord member 22 is pressed by the press roller 60 toward the outer circumferential surface 16A of the crown portion 16. The reinforcing cord member 22 is deformed by the press roller 60 such that the sticking face 22C side bulges out in the tire axial direction (deformation by pressing and squashing as illustrated in FIG. 7), and tire axial direction adjacent portions of the resin covering layer 26 make contact with each other.

The resin covering layer 26 is then contacted by the cooling roller 70, and the melted portions of the crown portion 16 and the melted portions of the resin covering layer 26 harden when cooled through the resin covering layer 26, so as to weld the tire axial direction adjacent portions of the resin covering layer 26 together, and to weld the resin covering layer 26 and the crown portion 16 together.

The reinforcing cord member 22 is wound onto the outer circumferential surface 16A of the crown portion 16 in the tire circumferential direction so as to form a spiral shape, and the reinforcing cord member 22 is pressed onto the outer circumferential surface 16A while the crown portion 16 and the sticking face 22C of the reinforcing cord member 22 are respectively heated and melted, thereby forming the reinforcing layer 28 on the outer circumference of the tire case 17, specifically on the outer circumference of the crown portion 16.

Winding of the reinforcing cord member 22 onto the outer circumferential surface 16A of the crown portion 16 so as to form a spiral shape may be achieved by moving the position of the outlet port 46 of the cord feeder device 40 in the tire axial direction, or by moving the tire case 17 in the tire axial direction, while the tire case 17 is being rotated.

Figure 6:
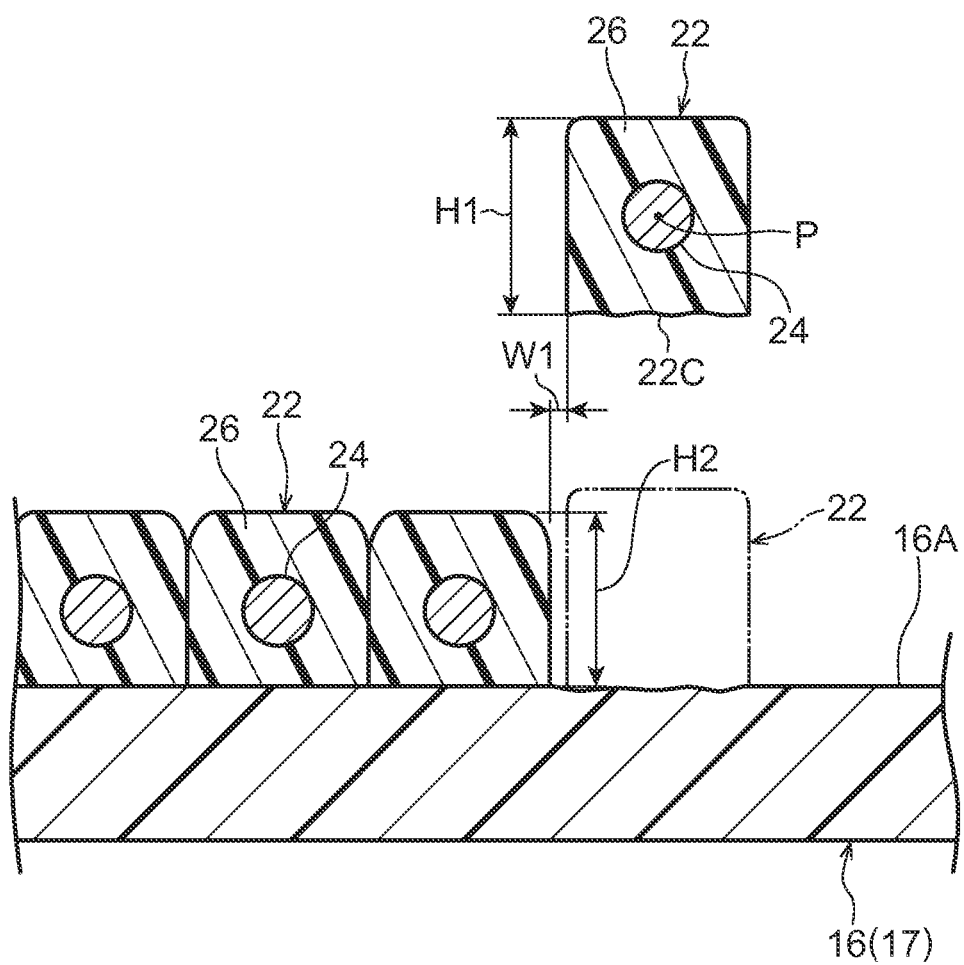
FIG. 6 is a cross-section taken along line 6X-6X in FIG. 5.
Figure 7:
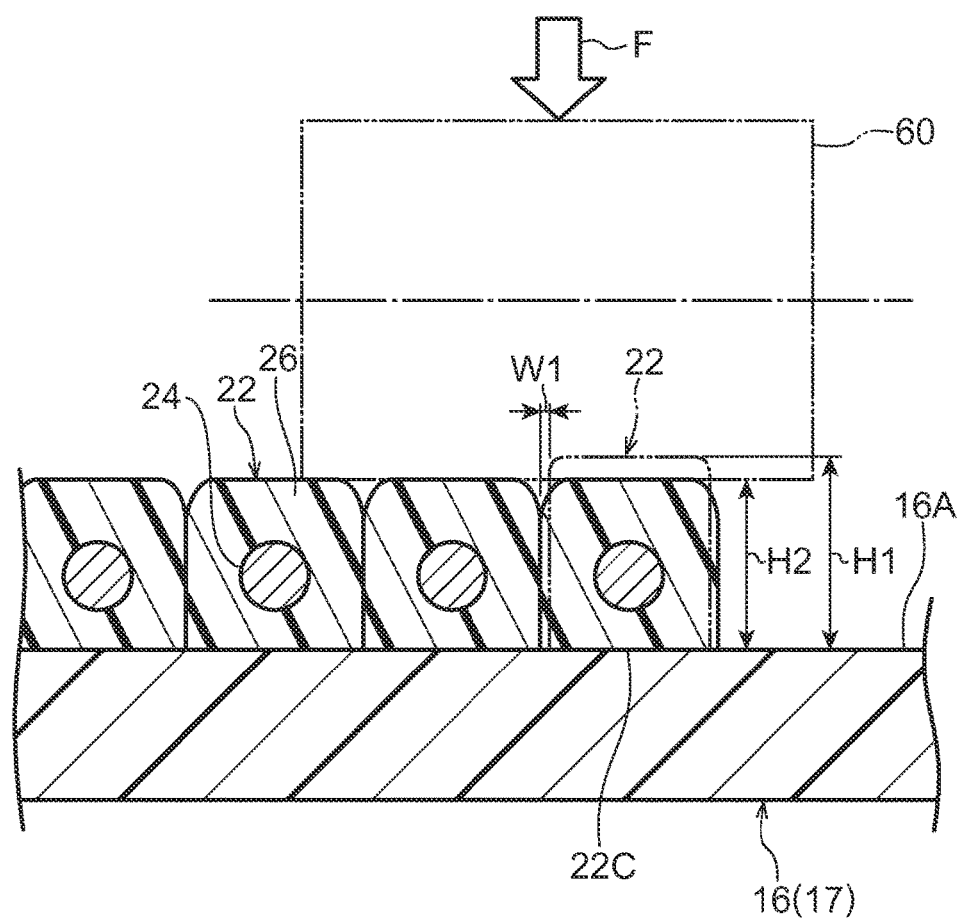
FIG. 7 is a cross-section taken along line 7X-7X in FIG. 5.

As illustrated in FIG. 6, in the present exemplary embodiment, when winding the reinforcing cord member 22 onto the outer circumferential surface 16A of the crown portion 16, the portion of the reinforcing cord member 22 that has been newly wound is placed so as to leave a separation W1 in the tire axial direction away from the portion of the reinforcing cord member 22 that has already been wound onto the crown portion 16. Winding the reinforcing cord member 22 onto the crown portion 16 in this manner in which the separation W1 is left enables winding of the reinforcing cord member 22 to be performed without the portion already wound interfering with the newly wound portion. Namely, the reinforcing cord member 22 can be wound smoothly. Even when the reinforcing cord member 22 is wound onto the crown portion 16 by leaving the separation W1, the newly wound portion is deformed by pressing and squashing with the press roller 60, as illustrated in FIG. 7, so as to be caused to contact the already wound portion. The tire axial direction adjacent portions of the reinforcing cord member 22 are thereby welded together, and the gaps between the tire axial direction adjacent portions disappear.

The reinforcing cord 24 prior to deformation is respectively indicated in FIG. 6 and FIG. 7 by double-dot intermittent lines.

As illustrated in FIG. 6 and FIG. 7, in the present exemplary embodiment, due to deformation by pressing and squashing, the reinforcing cord member 22 has a vertical width H2 after winding that is shorter than a vertical width H1 prior to winding onto the outer circumference of the tire case 17 (onto the outer circumferential surface 16A of the crown portion 16). The reinforcing cord member 22 prior to winding has the reinforcing cord 24 positioned at the center.

Moreover, tension of the reinforcing cord member 22 may be adjusted by applying braking to the reel 42 of the cord feeder device 40, or by providing a tension adjusting roller or the like (not illustrated in the drawings) along the guide path of the reinforcing cord member 22. Snaking when disposing the reinforcing cord member 22 can be suppressed by adjusting the tension.

Explanation follows regarding a rubber layer laminating process for laminating a rubber layer onto the tire radial direction outside of the tire case 17.

First, the roughening treatment (for example, roughening treatment using sandpaper, a grinder, a sandblaster, or the like) is performed on the surface (outer circumferential surface) of the reinforcing layer 28 disposed at the outer circumference of the tire case 17 and to the periphery of the reinforcing layer 28 in order to form fine indentations and projections.

Figure 8:
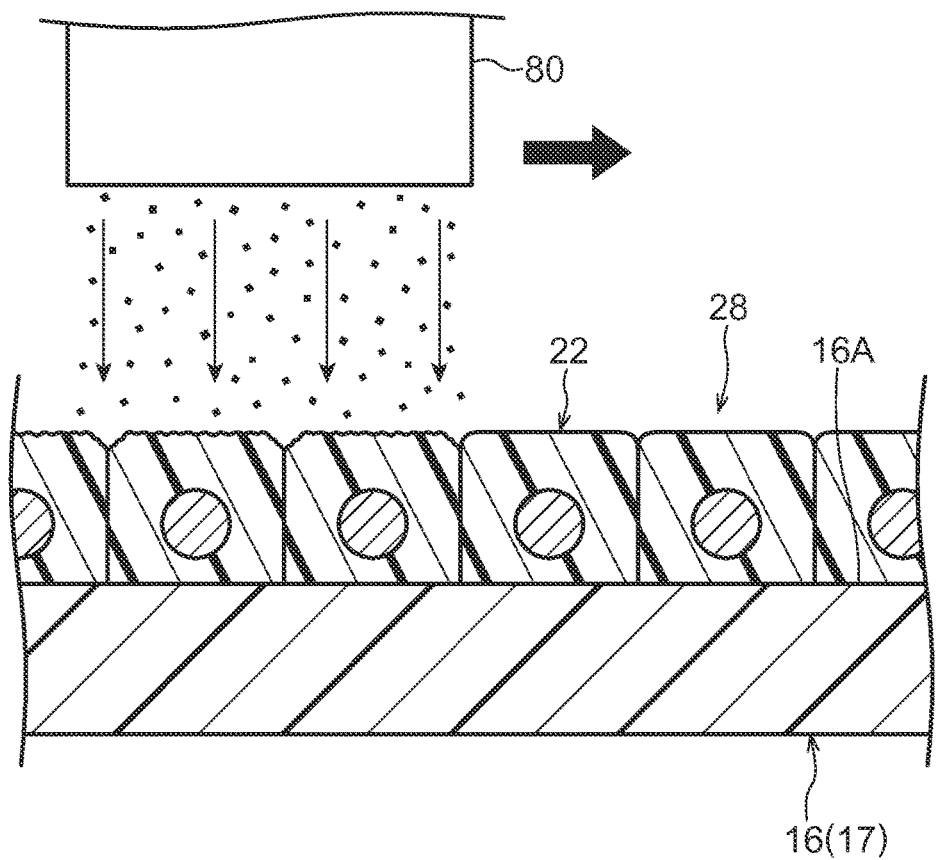
FIG. 8 is a cross-section taken along the tire axial direction of a tire case in order to explain an operation to perform roughening treatment on an outer circumferential surface of a reinforcing layer of the first exemplary embodiment.

In the present exemplary embodiment, projectile matter is ejected at high speed from a blast gun 80 toward the outer circumference of the tire case 17 that is rotating in the arrow A direction, and toward the outer circumferential surface of the reinforcing layer 28, forming fine indentations and projections in the outer circumference of the tire case 17 and the outer circumferential surface of the reinforcing layer 28 (see FIG. 8).

In the present exemplary embodiment, due to the sticking face 22C side of the reinforcing cord member 22 being heated and melted, and the reinforcing cord member 22 (the resin covering layer 26) being deformed by pressing and squashing, the thickness of the resin covering layer 26 becomes thicker on the opposite side to the bonded side. This thereby enables the reinforcing cord 24 to be prevented from being exposed to the outer circumferential surface of the reinforcing layer 28 during roughening treatment of the outer circumferential surface of the reinforcing layer 28 using the projectile matter ejected from the blast gun 80.

A bonding agent (not illustrated in the drawings) is then coated onto the roughening treated surface formed with the fine indentations and projections as described above.

As the bonding agent, a triazine thiol-based bonding agent, a chlorinated rubber-based bonding agent, a phenol-based resin bonding agent, an isocyanate-based bonding agent, or a halogenated rubber-based bonding agent, may be employed. The bonding agent is also preferably allowed to dry somewhat after being coated in order to raise the bonding force. Coating of the bonding agent is accordingly preferably performed in an atmosphere with a humidity of 70% or lower.

The roughening treated surface is preferably degreased by cleaning with a solvent such as alcohol, and subjected to corona treatment and ultraviolet irradiation processing.

Figure 9:
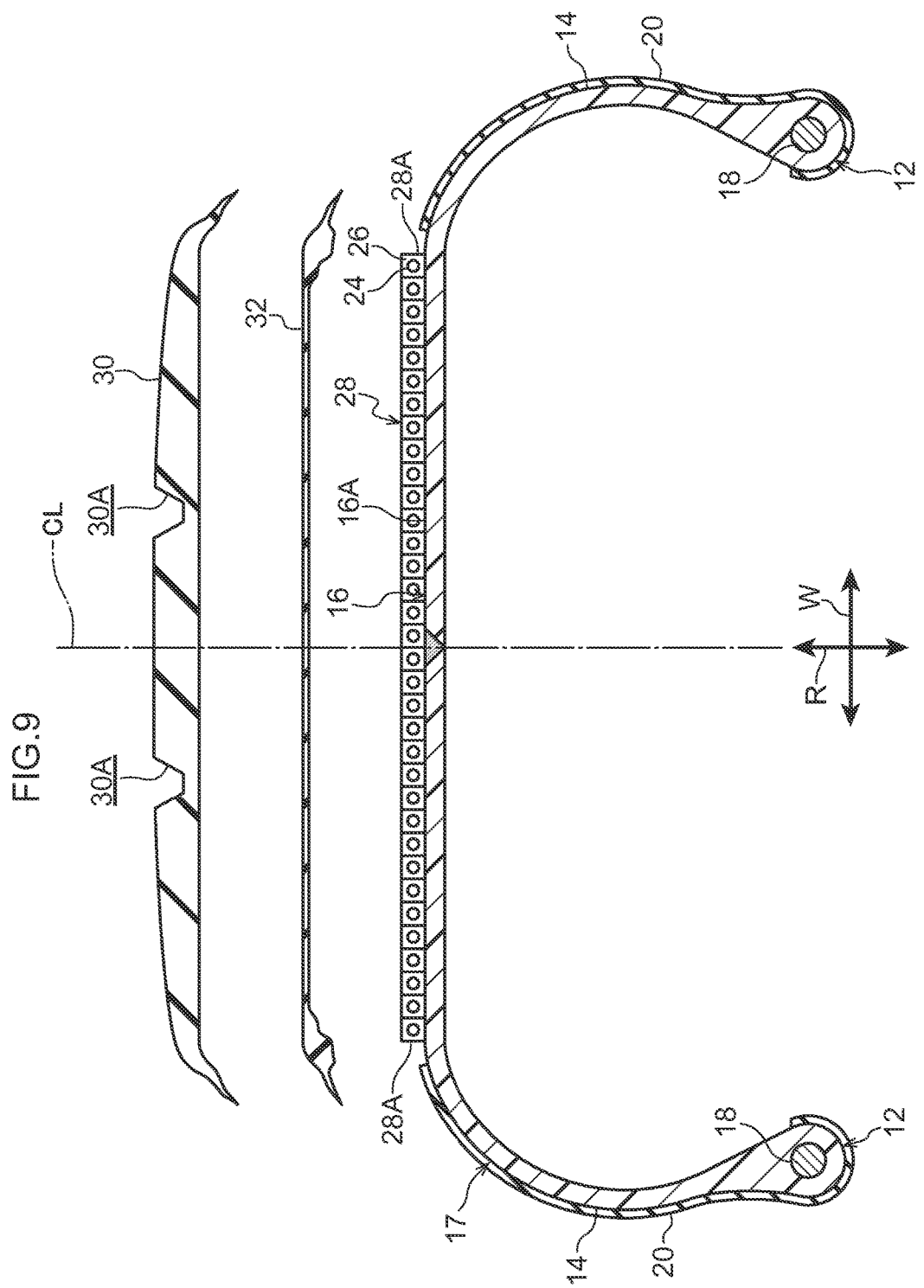
FIG. 9 is a cross-section taken along the tire axial direction of a tire case in order to explain a rubber layer lamination process of the first exemplary embodiment.

Then, as illustrated in FIG. 9, one turn of the non-vulcanized cushion rubber 32 and the semi-vulcanized or fully vulcanized band shaped tread 30 are respectively wound onto the outer circumference of the tire case 17 so as to cover the reinforcing layer 28 and the periphery thereof.

Fully vulcanized indicates a state in which the degree of vulcanization is that required of the finished product, and semi-vulcanized indicates a degree of vulcanization higher than that of a non-vulcanized state, but not as much as the degree of vulcanization that is required of the finished product.

A tread pattern such as that of the grooves 30A is pre-formed in the tread surface side (outer circumferential side) of the tread 30 when in a semi-vulcanized or vulcanized state. In order to form the tread pattern, a non-vulcanized tread 30 is vulcanized in a mold, so as to mold the tread 30 in a semi-vulcanized or fully vulcanized state.

Next, explanation follows regarding a vulcanization process to vulcanize the tire case 17 onto which the rubber layer has been laminated.

First, the tire case 17 is housed in a vulcanization can or mold and heated and vulcanized for a specific time at a specific temperature. The non-vulcanized cushion rubber 32 is thereby vulcanized to the degree of vulcanization of a final product. In cases in which the tread 30 employed is in a semi-vulcanized state, the tread 30 is further vulcanized, up to the degree of vulcanization of a final product.

The tire 10 is complete when the vulcanization process has been completed.

The sequence of each of the processes in the tire manufacturing method according to the present exemplary embodiment may be changed as appropriate.

Next, explanation follows regarding operation and advantageous effects of the tire 10.

In the tire 10 of the present exemplary embodiment, due to bonding together the tire axial direction adjacent portions of the resin covering layer 26 of the reinforcing cord member 22 that has been wound in the tire circumferential direction so as to form a spiral shape, the rigidity (the rigidity in each of the tire circumferential direction, tire axial direction, and tire radial direction, respectively) of the reinforcing layer 28 configured by the reinforcing cord member 22 bonded to the tire case 17 is raised, compared to cases, for example, in which the tire axial direction adjacent portions of the resin covering layer 26 of the reinforcing cord member 22 are not bonded together. In particular, in the present exemplary embodiment, due to the tire axial direction adjacent portions of the resin covering layer 26 being welded together, the bonding force between the tire axial direction adjacent portions of the resin covering layer 26 is increased, and the rigidity of the reinforcing layer 28 is raised even more.

This thereby enables the rigidity of the tire case 17 onto which the reinforcing layer 28 is bonded, specifically the rigidity of the crown portion 16, to be efficiently raised.

Due to the resin covering layer 26 of the reinforcing cord member 22 being bonded (welded in the present exemplary embodiment) to the tire case 17, the bonding force is raised between the reinforcing layer 28 and the tire case 17, efficiently suppressing delamination between the reinforcing layer 28 and the tire case 17.

Moreover, due to the outer circumference of the tire case 17 at the portion where the reinforcing cord member 22 is disposed, namely the outer circumferential surface 16A of the crown portion 16, being flat-shaped along the tire axial direction, in the tire manufacturing processes, positional misalignment can be suppressed when winding the reinforcing cord member 22 on the outer circumference of the tire case 17 (the outer circumferential surface 16A of the crown portion 16), enabling the tire axial direction adjacent portions of the reinforcing cord member 22 to be bonded together (welded in the present exemplary embodiment) with greater certainty than, for example, cases in which the outer circumference of the tire case 17 is curved in tire axial direction cross-section at the portion where the reinforcing cord member 22 is disposed.

In the tire 10, due to employing a thermoplastic resin as the frame resin material employed in the tire case 17, and as the covering resin material employed in the resin covering layer 26, each of the resin materials of the heated and melted resin covering layer 26 and the heated and melted tire case 17 is mixed together when the reinforcing cord member 22 is wound onto the crown portion 16, raising the bonding force between the reinforcing cord member 22 and the tire case 17.

Moreover, in the tire 10, due to employing a thermoplastic resin as the frame resin material employed in the tire case 17, damage sustained by the tire case 17 can be repaired by melting the periphery of the damage, or repaired by filling the damage with the same melted resin material as that of the frame resin material.

Moreover, in the tire 10, due to the frame resin material employed in the tire case 17 and the covering resin material employed in the resin covering layer 26 being the same material, the production costs of the tire case 17 can be reduced compared to cases in which different resin materials are employed.

In the tire 10, due to the thickness of the resin covering layer 26 being thicker at the opposite side to the side bonded to the tire case 17, it becomes easier, during tire dismantling, to insert a tool (for example an ultrasonic welder for melting resin material using ultrasonic vibration) for cutting while melting the resin material having thermoplasticity, between the reinforcing cord 24 and the rubber layer (into the thermoplastic resin portion) when peeling the rubber layer (the tread 30 and the cushion rubber 32 in the present exemplary embodiment) away from the reinforcing layer 28. This thereby enables easy dismantling of the tire 10.

In the first exemplary embodiment, configuration is made such that the reinforcing cord member 22 and the crown portion 16 are heated and melted using the heating device 50, however, the present invention is not limited to such a configuration, and configuration may be made such that the reinforcing cord member 22 alone is heated and melted by the heating device 50. Obviously, in such cases the tire axial direction adjacent portions of the reinforcing cord member 22 can be welded together by deforming by pressing and squashing the reinforcing cord member 22.

Moreover, although in the first exemplary embodiment a configuration is adopted in which the tire case 17 is formed from a thermoplastic resin, the present invention is not limited thereto, and a configuration may be adopted in which the tire case 17 is formed from a thermoset resin. In such cases too, similarly to as described above, the tire axial direction adjacent portions of the reinforcing cord member 22 can be welded together deforming the reinforcing cord member 22 by pressing and squashing.

Moreover, although in the first exemplary embodiment a configuration was adopted in which the resin covering layer 26 of the reinforcing cord member 22 and the crown portion 16 of the tire case 17 were welded, the present invention is not limited to such a configuration, and a configuration may be adopted in which the resin covering layer 26 of the reinforcing cord member 22 and the crown portion 16 of the tire case 17 are bonded together with a bonding agent.

Moreover, although in the first exemplary embodiment a configuration is adopted in which the tire case 17 and the resin covering layer 26 are formed from thermoplastic resins, the present invention is not limited to such a configuration, and a configuration may be adopted in which the tire case 17 and the resin covering layer 26 are formed from thermoset resins. In such cases, configuration is made such that the resin covering layer 26 of the reinforcing cord member 22 and the crown portion 16 of the tire case 17 are bonded together with a bonding agent as described above.

In the first exemplary embodiment, the cross-section profile of the tire 10 is configured with a shape that is substantially similar to that of the type of pneumatic rubber tire that is fitted to a rim, however, the present invention is not limited to such a configuration, and the tire 10 may have a circular tube-shaped cross-section profile. Obviously the rigidity of the tire 10 is increased by the reinforcing layer 28 in such cases, too.

Although examples have been given above to explain exemplary embodiments of the present invention, these are merely examples of embodiments, and various modifications may be made within a range not departing from the spirit of the present invention. Moreover, obviously the scope of rights of the present invention is not limited by these exemplary embodiments.

The entire disclosure of Japanese Patent Application No. 2013-087432 filed on Apr. 18, 2013, is incorporated by reference within the present specification.

The invention claimed is:

1. A tire comprising:
a circular tire frame member that is formed using a frame resin material; and
a reinforcing cord member that is disposed at an outer circumference of the tire frame member, that is configured by a reinforcing cord covered with a resin covering layer, that is wound along a tire circumferential direction so as to form a spiral shape, that is bonded to the tire frame member, and in which tire axial direction adjacent portions of the reinforcing cord member are bonded together, wherein:
the resin covering layer has thermoplasticity,
in the reinforcing cord member, the resin covering layer is welded to the tire frame member, and the tire axial direction adjacent portions are welded together, and
a thickness of the resin covering layer, at an opposite side of the resin covering layer from a side that is bonded to the tire frame member, is greater than a thickness of the resin covering layer at the side that is bonded to the tire frame member.

2. The tire of claim 1, wherein:
at the outer circumference of the tire frame member, a portion at which the reinforcing cord member is disposed has a flat-shape in a tire axial direction cross-section.

3. The tire of claim 1, wherein the frame resin material has thermoplasticity.

4. A tire manufacturing method comprising:
a tire frame member forming process in which a circular tire frame member is formed using a frame resin material; and
a reinforcing cord member winding process in which, while winding a reinforcing cord member that is configured by a reinforcing cord covered with a resin covering layer onto an outer circumference of the tire frame member along a tire circumferential direction so as to form a spiral shape, the reinforcing cord member is bonded to the tire frame member, and tire axial direction adjacent portions of the reinforcing cord member are bonded together, wherein:
the resin covering layer has thermoplasticity, and
in the reinforcing cord member winding process, while the resin covering layer of the reinforcing cord member is being heated and melted, the reinforcing cord member is wound onto the outer circumference of the tire frame member in a tire circumferential direction so as to form a spiral shape and is pressed against the outer circumference, thereby welding the tire frame member and the resin covering layer of the reinforcing cord member together and deforming the reinforcing cord member during pressing such that tire axial direction adjacent portions of the resin covering layer are placed in contact with, and welded to, each other.

* * * * *